(12) United States Patent
Storn (10) Patent No.: US 12,356,204 B2
(45) Date of Patent: Jul. 8, 2025

(54) COGNITIVE RADIO COMMUNICATION DEVICE AND METHOD OF OPERATING THE SAME

(71) Applicant: Rohde & Schwarz GmbH & Co. KG, Munich (DE)

(72) Inventor: Rainer Storn, Kirchheim (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 415 days.

(21) Appl. No.: 17/992,535

(22) Filed: Nov. 22, 2022

(65) Prior Publication Data
US 2023/0180014 A1 Jun. 8, 2023

(30) Foreign Application Priority Data
Dec. 7, 2021 (EP) ..................................... 21212691

(51) Int. Cl.
*H04W 16/14* (2009.01)
*H04B 1/00* (2006.01)
*H04W 24/02* (2009.01)

(52) U.S. Cl.
CPC .......... *H04W 16/14* (2013.01); *H04B 1/0003* (2013.01); *H04W 24/02* (2013.01)

(58) Field of Classification Search
CPC ....... H04W 16/14; H04W 24/02; H04B 1/003
See application file for complete search history.

(56) References Cited

U.S. PATENT DOCUMENTS

| | | |
|---|---|---|
| 6,587,451 B1 | 7/2003 | Kwon et al. |
| 9,860,352 B2 | 1/2018 | Fisher et al. |
| 10,270,506 B2 | 4/2019 | Martin et al. |

(Continued)

FOREIGN PATENT DOCUMENTS

| | | |
|---|---|---|
| CN | 104320219 A | 1/2015 |
| CN | 106850028 A | 6/2017 |

(Continued)

OTHER PUBLICATIONS

Office Action for related European Patent Application No. 21212691.6-1215, dated May 11, 2022, 7 pages.

(Continued)

*Primary Examiner* — Curtis B Odom
(74) *Attorney, Agent, or Firm* — DITTHAVONG, STEINER & MLOTKOWSKI (57) ABSTRACT

Disclosed is a cognitive radio, CR, communication device, including a CR transceiver and a digital twin of the CR transceiver. The CR transceiver includes a radio scene analyser for analysing state information of a radio scene involving the CR communication device, and a cognitive engine for controlling a radio performance of the CR communication device. The cognitive engine includes a radio performance analyser for analysing a radio performance of the CR transceiver or a radio performance of the digital twin; a radio performance optimizer for optimizing the radio performance of the CR transceiver or the radio performance of the digital twin in accordance with the radio performance analyser and the radio scene analyser; and a radio configurator for configuring the CR transceiver or the digital twin in accordance with the radio performance optimizer.

15 Claims, 5 Drawing Sheets

(56) References Cited

U.S. PATENT DOCUMENTS

| | | | |
|---|---|---|---|
| 10,645,708 B2 | 5/2020 | Klemp et al. | |
| 10,931,348 B2 | 2/2021 | Chavva et al. | |
| 11,146,970 B1 | 10/2021 | Moinuddin et al. | |
| 2012/0195212 A1* | 8/2012 | Zhang | H04W 72/1215 370/252 |
| 2020/0045559 A1 | 2/2020 | Kim et al. | |
| 2021/0105648 A1 | 4/2021 | Kim | |
| 2021/0105683 A1 | 4/2021 | You et al. | |
| 2021/0127402 A1 | 4/2021 | Lee et al. | |
| 2021/0235296 A1 | 7/2021 | Kim | |
| 2021/0314835 A1 | 10/2021 | Lee et al. | |

FOREIGN PATENT DOCUMENTS

| | | |
|---|---|---|
| CN | 108449122 A | 8/2018 |
| CN | 112511197 A | 3/2021 |
| EP | 776557 B1 | 5/2006 |
| EP | 1852786 A1 | 11/2007 |
| EP | 2401865 A1 | 1/2012 |
| EP | 3830980 A1 | 6/2021 |
| RU | 2755259 C1 | 9/2021 |
| WO | 2010099453 A1 | 9/2010 |
| WO | 201881870 A1 | 5/2018 |
| WO | 2020051508 A1 | 3/2020 |
| WO | 202071880 A1 | 4/2020 |
| WO | 2020099437 A2 | 5/2020 |
| WO | 2020099437 A3 | 7/2020 |
| WO | 2020197176 A1 | 10/2020 |
| WO | 202115553 A1 | 1/2021 |

OTHER PUBLICATIONS

Celebi et al., "Cognitive-Radio Systems for Spectrum, Location, and Environmental Awareness", IEEE Antennas and Propagation Magazine, vol. 52, No. 4, Aug. 2010, pp. 41-61.

Ge et al., "Cognitive Radio: From Spectrum Sharing to Adaptive Learning and Reconfiguration", IEEEAC paper #1668, Revision 2, Jan. 14, 2008, pp. 1-10.

Zhao, "Enabling Cognitive Radios through Radio Environment Maps", May 8, 2007, 188 pages.

* cited by examiner

COGNITIVE RADIO COMMUNICATION DEVICE AND METHOD OF OPERATING THE SAME

TECHNICAL FIELD

The present disclosure relates to Cognitive Radio communication, a form of wireless communication that is aware of and adaptive to its environment. In particular, the present disclosure relates to a cognitive radio communication device and a method of operating the same.

BACKGROUND ART

Cognitive Radios may refer to radio communication devices having no fixed radio configuration and being aware of and adaptive to their environment so as to achieve optimal performance in terms of maximum throughput/goodput, minimum latency/delay maximum connectivity and the like, or Pareto-optimal performance (i.e., multi-objective optimization). Adaptivity has initially been restricted to dynamic frequency management/selection, but the advent of software (-defined) radio enables adaptivity to be thought of in a more general manner.

SUMMARY

The present disclosure aims to provide more intelligent Cognitive Radio communication devices.

The objective is achieved by the embodiments as defined by the appended independent claims. Preferred embodiments are set forth in the dependent claims and in the following description and drawings.

A first aspect of the present disclosure relates to a cognitive radio, CR, communication device, comprising a CR transceiver and a digital twin of the CR transceiver. The CR transceiver comprises a radio scene analyser for analysing state information of a radio scene involving the CR communication device, and a cognitive engine for controlling a radio performance of the CR communication device. The cognitive engine includes a radio performance analyser for analysing a radio performance of the CR transceiver or a radio performance of the digital twin; a radio performance optimizer for optimizing the radio performance of the CR transceiver or the radio performance of the digital twin in accordance with the radio performance analyser and the radio scene analyser; and a radio configurator for configuring the CR transceiver or the digital twin in accordance with the radio performance optimizer.

The radio scene may comprise one or more of: a spectrum allocation, a spectrum availability, and a spectrum use.

The CR transceiver may further comprise a transceiver frontend; and the cognitive engine may be configured, in a first mode of operation, to control the radio performance of the CR transceiver based on an optimization of a radio configuration of the transceiver frontend in accordance with analysed radio performance metrics of the transceiver frontend.

The transceiver frontend may comprise a software-defined radio, SDR, transceiver frontend.

The radio configuration of the transceiver frontend may comprise one or more of: a waveform, a transmission power, a transmission frequency, and a reception frequency.

The radio performance metrics of the transceiver frontend may comprise one or more of: a queue occupancy, a number of transmission retries, a throughput, a goodput, a latency, a received signal strength indication, RSSI, and a signal-to-noise ratio, SNR.

The radio performance optimizer may be configured to optimize the radio configuration of the transceiver frontend based on real-time adaptive signal processing.

The digital twin may further comprise a model of the transceiver frontend. Radio performance metrics of the model of the transceiver frontend may depend on the radio configuration of the model of the transceiver frontend and radio performance metrics and state information of the transceiver frontend. The cognitive engine may be configured, in a second mode of operation different from the first mode of operation, to control the radio performance of the CR transceiver based on an optimization of the radio configuration of the model of the transceiver frontend in accordance with analysed radio performance metrics of the model of the transceiver frontend.

The radio performance optimizer may be configured to optimize the radio configuration of the model of the transceiver frontend based on iterative global optimization. The radio configurator may be configured to apply a configuration of the model of the transceiver frontend to the transceiver frontend if the analysed radio performance metrics of the model of the transceiver frontend outperform the analysed radio performance metrics of the transceiver frontend by a preset threshold.

The global optimization may comprise evolutionary computation.

An objective function of the global optimization may comprise one or more of: a maximum connectivity, a minimal latency, a maximum goodput, a maximum interference robustness, a minimum observability, a maximum doppler immunity, and a maximum communication reach.

The cognitive engine may be configured, in a third mode of operation different from the first and second modes of operation, to control the radio performance of the CR transceiver based on experience-based problem solving.

The experience-based problem solving may comprise one or more of: deep learning of optimized radio configurations in dependence of respective analysed state information of radio scenes and analysed radio performance metrics; and reinforcement learning of optimized radio configurations in dependence of respective analysed state information of radio scenes and analysed radio performance metrics.

The deep learning may comprise supervised learning.

A second aspect of the present disclosure relates to a method of operating a CR communication device. The CR communication device comprises a CR transceiver and a digital twin of the CR transceiver. The method comprises analysing, by a radio scene analyser of the CR transceiver, a state information of a radio scene involving the CR communication device; and controlling, by a cognitive engine of the CR transceiver, a radio performance of the CR communication device. The controlling includes analysing, by a radio performance analyser of the cognitive engine, a radio performance of the CR transceiver or a radio performance of the digital twin; optimizing, by a radio performance optimizer of the cognitive engine, the radio performance of the CR transceiver or the radio performance of the digital twin in accordance with the radio performance analyser and the radio scene analyser; and configuring, by a radio configurator of the cognitive engine, the CR transceiver or the digital twin in accordance with the radio performance optimizer.

ADVANTAGEOUS EFFECTS

The present disclosure provides more intelligent Cognitive Radio (CR) communication devices by facilitating adaptivity on all appropriate OSI layers, taking into account radio platform aspects, and enabling multi-stage optimization of radio performance: real-time adaptive, model-based global, and experience-based.

The CR communication device adapts to the electromagnetic environment so as to optimize performance metrics such as throughput/goodput, latency or connectivity, and to mitigate intentional (jammers) as well as unintentional interference.

Advantageously, the technical effects and advantages described above in relation with the CR communication device equally apply to the method of operating the same having corresponding features.

BRIEF DESCRIPTION OF DRAWINGS

The above-described aspects and implementations will now be explained with reference to the accompanying drawings, in which the same or similar reference numerals designate the same or similar elements.

The features of these aspects and implementations may be combined with each other unless specifically stated otherwise.

The drawings are to be regarded as being schematic representations, and elements illustrated in the drawings are not necessarily shown to scale. Rather, the various elements are represented such that their function and general purpose become apparent to those skilled in the art.

DETAILED DESCRIPTIONS OF DRAWINGS

Figure 1:
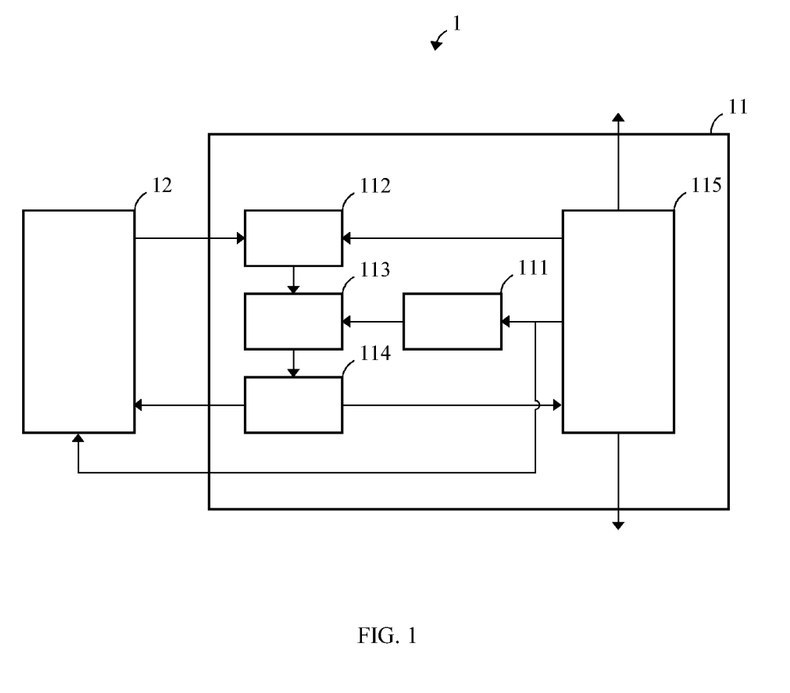
FIG. 1 schematically illustrates a CR communication device in accordance with the present disclosure.

FIG. 1 schematically illustrates a CR communication device 1 in accordance with the present disclosure.

The CR communication device 1 comprises a CR transceiver 11 and a digital twin 12 of the CR transceiver 11.

As used herein, a transceiver may refer to a combination of a transmitter and a receiver acting as a liaison between digital payload data and transferable electromagnetic waveforms. Transceivers typically include a (transceiver) chain of signal processing functions, which may broadly be classified into digital baseband processing, digital/analog conversion and analog radio-frequency (RF)/Intermediate-Frequency (IF) processing.

As used herein, a digital twin may refer to a data-driven digital/virtual replica of a physical/real object or process. In this connection, data-driven may mean that progress in an activity is compelled by data, rather than by intuition or experience. A digital twin may represent a behaviour or attributes of the underlying physical/real object or process by means of models, simulations, algorithms and the like. The underlying physical/real object or process may (and typically is) adapted upon significant deviations from its digital/virtual replica.

The CR transceiver 11 comprises a radio scene analyser 111 and a cognitive engine 112, 113, 114. The CR transceiver 11 may further comprise a transceiver frontend 115 for accessing the physical channel. In particular, the transceiver frontend 115 may comprise a software-defined radio, SDR, transceiver frontend, and may incorporate all functional layers of the OSI model.

As used herein, software(-defined) radio may refer to a widest possible digitization of transceiver chains. This may particularly apply to signal processing functions of digital baseband processing.

The radio scene analyser 111 is suitable for analysing state information of a radio scene involving the CR communication device 1.

The radio scene analyser 111 may be configured to perform spectrum sensing, in particular by analysing and monitoring the electromagnetic environment in terms of frequency bands, interference and physical propagation conditions. The radio scene analyser 111 may further be configured to predict signals by extrapolating a spectrum use in terms of probabilities for spectral vacancies/blocking of channels or suspension of disturbances. The radio scene analyser 111 may further be configured to classify the analysed data into a format being suitable for decision-making by the cognitive engine 112, 113, 114. For example, classification results may comprise channel lists provided with information such as channel quality, channel availability, interference power, signal power, information on channel users (primary users, secondary users) or information on jammers classified into jammer types and characterized by their most important parameters. The radio scene analyser 111 may further be configured to provide the classification results (i.e., analysed state information) as a parameter matrix.

The radio scene may therefore comprise one or more of: a spectrum allocation (i.e., the allocation and regulation of the electromagnetic spectrum into frequency bands), a spectrum availability, a spectrum use (e.g., a presence of primary users, secondary users, jammers) and the like.

The cognitive engine 112, 113, 114 is suitable for controlling a radio performance of the CR communication device 1, and includes a radio performance analyser 112, a radio performance optimizer 113 and a radio configurator 114.

The radio performance analyser 112 is suitable for analysing a radio performance of the CR transceiver 11 or a radio performance of the digital twin 12. In more detail, the radio performance analyser 112 may be configured to receive radio performance metrics of the CR transceiver 11 as well as radio performance metrics of the digital twin 12, and provide a cost (or reward) metric for optimization of the radio communication. The radio performance metrics may comprise one or more of: a queue occupancy, a number of transmission retries, a throughput, a goodput, a latency, a received signal strength indication, RSSI, a signal-to-noise ratio, SNR, and the like.

Figure 2:
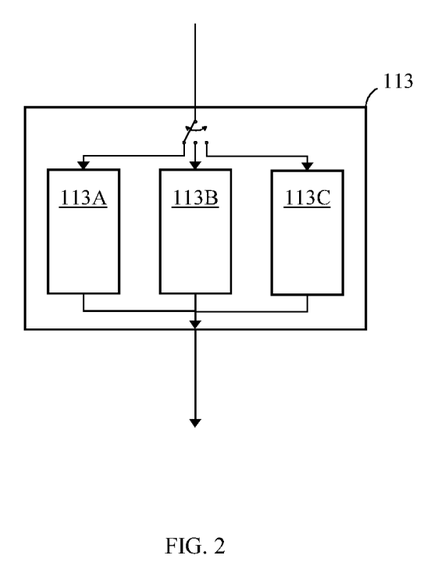
FIG. 2 schematically illustrates a radio performance optimizer of a CR transceiver of the CR communication device of FIG. 1.

The radio performance optimizer 113 as schematically illustrated in FIG. 2 is suitable for optimizing the radio performance of the CR transceiver 11 or the radio performance of the digital twin 12 in accordance with the radio performance analyser 112 and the radio scene analyser 111. As such, the radio performance optimizer 113 may be configured to receive the cost (or reward) metric of the radio performance analyser 112 as well as the analysed state information of the radio scene analyser 111, and provide a parameter vector instructing a particular radio configuration.

Additionally, the radio performance optimizer 113 may further be configured to receive supplementary information provided by so-called Higher Level Management Services, which may further constrain optimization (e.g. forbidden frequency ranges due to regulatory requirements) or support optimization (e.g. GPS positions and trajectories of communication peers as well as terrain information enabling prediction of shadowing).

As can be seen in FIG. 2, the radio performance optimizer 113 may selectively be operated in a first mode 113A of operation, a second mode 113B of operation or a third mode 113C of operation. The radio performance optimizer 113 will be explained in more detail in connection with FIGS. 3 and 4 below.

The radio configurator 114 is suitable for configuring the CR transceiver 11 or the digital twin 12 in accordance with the radio performance optimizer 113. More specifically, the radio configurator 114 may be configured to receive the parameter vector of the radio performance optimizer 113 instructing a particular radio configuration, and (re-)configure the radio configuration accordingly. The actual (re-)configuration may be subject to prior exchange and negotiation of radio configuration parameters with communication peers. The (re-)configuration may comprise a number of actions, such as allocation of radio resources, medium access, routing of packets, changing radio communication methods or configuration parameters, and the like.

Figure 3:
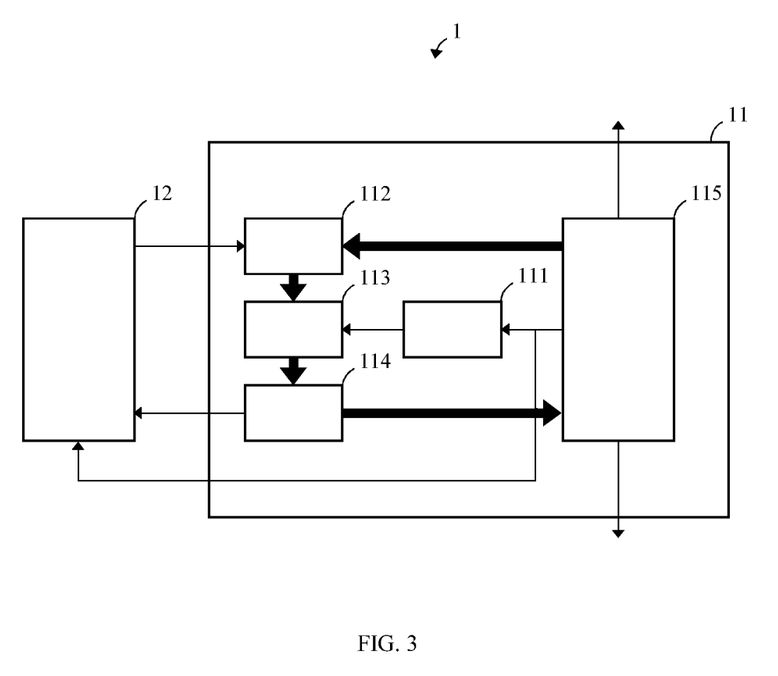
FIG. 3 schematically illustrates the CR communication device of FIG. 1 being operated in a first mode of operation.

FIG. 3 schematically illustrates the CR communication device 1 of FIG. 1 being operated in the first mode 113A of operation.

In said first mode 113A of operation, the cognitive engine 112, 113, 114 may be configured to control the radio performance of the CR transceiver 11 based on an optimization of a radio configuration of the transceiver frontend 115 in accordance with analysed radio performance metrics of the transceiver frontend 115.

More specifically, the radio performance analyser 112 analyses the radio performance of the transceiver frontend 115, the radio performance optimizer 113 optimizes the radio performance of the transceiver frontend 115 in accordance with the radio performance analyser 112 and the radio scene analyser 111, in particular based on real-time adaptive signal processing, and the radio configurator 114 (re-)configures the transceiver frontend 115 in accordance with the radio performance optimizer 113.

In other words, the first mode 113A of operation may involve a real-time adaptive optimization of the radio performance of the transceiver frontend 115. According to FIG. 3, this constitutes an optimization loop (indicated in FIG. 3 by solid bold arrows) purely involving elements of the CR transceiver 11.

The radio configuration of the transceiver frontend 115 may comprise one or more of: a waveform, a transmission power, a transmission frequency, and a reception frequency.

As used herein, a waveform may refer to a particular radio communication method defining all network layer, data link layer and physical layer aspects characterizing the specific waveform.

The radio performance metrics of the transceiver frontend 115 may comprise one or more of: a queue occupancy, a number of transmission retries, a throughput, a goodput, a latency, a received signal strength indication, RSSI, and a signal-to-noise ratio, SNR.

As used herein, a throughput may refer to a total rate of transferred data over a communication channel, usually measured in bits per second.

As used herein, a goodput may refer to a useful rate of the transferred data over the communication channel, taking into account various protocol overheads.

As used herein, a received signal strength indicator/RSSI may refer to a relative received signal strength in wireless communication. The greater the RSSI value, the better the analog signal strength.

As used herein, a SNR may refer to a ratio of signal power to noise power, often expressed in decibels. The greater the SNR value, the better the analog signal quality.

The real-time adaptive optimization in said first mode 113A of operation may involve all radio configuration parameters for which corresponding signal theory (and algorithms) are available, such as null-steering of directed antennas so as to mask jammers localized by direction of arrival (DoA) methods, adaptation of channel modulation from symbol to symbol due to SNR variations, adaptation of channel equalization from symbol to symbol, adaptation of channel coding in terms of iterations (e.g. in connection with Turbo codes), and the like.

Of note, the afore-mentioned optimization loop may actually be implemented locally within the transceiver frontend 115 for efficiency reasons. The optimization may take place concurrently to ongoing radio communications.

Figure 4:
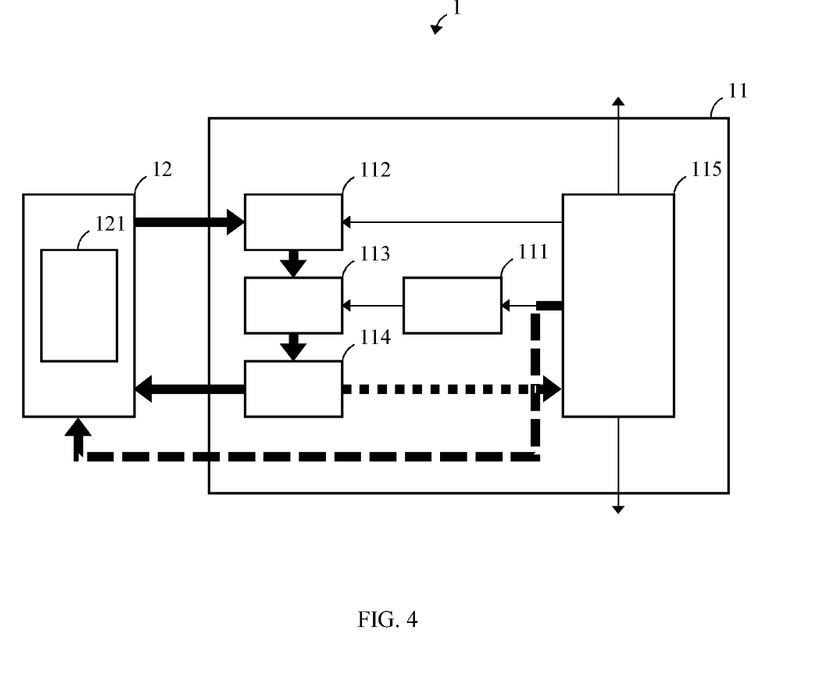
FIG. 4 schematically illustrates the CR communication device of FIG. 1 being operated in a second mode of operation.

FIG. 4 schematically illustrates the CR communication device 1 of FIG. 1 being operated in a second mode 113B of operation.

To this end, the digital twin 12 may comprise a model 121 of the transceiver frontend 115.

The model 121 may represent the whole transceiver frontend 115 including all functional layers of the OSI model. More specifically, the model 121 may comprise hardware abstractions as far as necessary (e.g., analog and digital components, transfer functions, nonlinearities, sensitivities, control loops, limited accuracies resulting from word lengths, and the like), platform software abstractions as far as necessary (e.g., delays/latencies due to network processing, such as queueing or buffering, or due to digital signal processing, such as cryptographic processing), and waveform software abstractions of all required OSI layers (e.g., SNR, SINR, RSSI, bit error ratio/BER, packet error ratio, coding gains, protocol overhead, delays/latencies in connection with medium access (e.g., due to capability exchange/mode select negotiations with communication peers) and due to packet retransmissions.

In said second mode 113B of operation different from the first mode 113A of operation, the cognitive engine 112, 113, 114 may be configured to control the radio performance of the CR transceiver 11 based on an optimization of the radio configuration of the model 121 of the transceiver frontend 115 in accordance with analysed radio performance metrics of the model 121 of the transceiver frontend 115.

More specifically, after the model 121 of the transceiver frontend 115 of the digital twin 12 is put into action/initialized/updated (indicated in FIG. 4 by a dashed bold arrow) based on digital/analog data and state information of the transceiver 115, the radio performance analyser 112 analyses the resulting radio performance of the digital twin 12, the radio performance optimizer 113 optimizes the radio performance of the digital twin 12 in accordance with the radio performance analyser 112, in particular based on iterative global optimization, and the radio configurator 114 (re-)configures the digital twin 12 in accordance with the radio performance optimizer 113.

For example, the information used to put the model 121 into action may comprise settings of the transceiver frontend 115 (e.g., relating to modulation, channel coding and the like), current performance metrics (e.g., SNR, RSSI, BER and the like) and so on.

In other words, the second mode 113B of operation may involve an iterative optimization of the radio performance of the digital twin 12. According to FIG. 4, this constitutes an optimization loop (indicated in FIG. 4 by solid bold arrows) involving elements of the CR transceiver 11 and the digital twin 12.

In particular, the global optimization may comprise evolutionary computation.

As used herein, evolutionary computation may refer to a class of algorithms for global optimization inspired by biological evolution, wherein an initial set of candidate solutions is iteratively subjected to selection and/or mutation to gradually evolve in fitness in accordance with a given fitness (or objective) function.

Iterative optimization may be particularly useful in connection with optimization of multiple objectives (Pareto optimization) or highly complex objective functions.

Methods of evolutionary computation such as Differential Evolution, which can be parallelized well and may converge quickly based on hardware acceleration, may nevertheless require thousands of iterations for convergence. During the computation interval, the ongoing radio communication should not be affected by (re-)configuration of the same.

The radio configurator 114 may be configured to apply the configuration of the model 121 of the transceiver frontend 115 to the transceiver frontend 115 if the analysed radio performance metrics of the model 121 of the transceiver frontend 115 outperform the analysed radio performance metrics of the transceiver frontend 115 by a preset threshold.

The preset threshold may be an absolute value such as a difference, or a relative value such as a ratio.

Additionally, it may be required to negotiate network-wide changes of the configuration of the transceiver frontend 115, such as a change of waveform, with affected communication peers (e.g. Capability Exchange/Mode Select). During the negotiation interval, the ongoing radio communication should not be affected by (re-)configuration of the same. Therefore, the (re-)configuration (indicated in FIG. 4 by a dotted bold arrow) takes place at a particular switchover time only upon prior agreement.

An objective function of the global optimization may comprise one or more of: a maximum connectivity, a minimal latency, a maximum goodput, or other communication-related performance measures, such as a maximum interference robustness, a minimum observability, a maximum doppler immunity, and a maximum communication reach (i.e., distance).

When operated in the third mode 113C of operation (not illustrated) different from the first and second modes 113A, 113B of operation, the cognitive engine 112, 113, 114 may be configured to control the radio performance of the CR transceiver 11 based on experience-based problem solving.

More specifically, the radio performance analyser 112 analyses the radio performance of the CR transceiver 11 or the radio performance of the digital twin 12, the radio performance optimizer 113 optimizes the radio performance of the CR transceiver 11 or the radio performance of the digital twin 12 in accordance with the radio performance analyser 112 and the radio scene analyser 111, and the radio configurator 114 configures the CR transceiver 11 in accordance with the radio performance optimizer 113.

The experience-based problem solving may comprise one or more of: deep learning of optimized radio configurations in dependence of respective analysed state information of radio scenes and analysed radio performance metrics; and reinforcement learning of optimized radio configurations in dependence of respective analysed state information of radio scenes and analysed radio performance metrics.

As used herein, deep learning may refer to machine learning by an artificial neural network (hosted by the radio performance optimizer 113) being subjected to a feature learning method, such as supervised learning, for example.

As used herein, supervised learning may refer to machine learning (by the artificial neural network of the radio performance optimizer 113) of a function that maps an input (i.e., the analysed state information of the radio scene and the analysed radio performance metrics) to an output (i.e., a radio configuration) based on exemplary input-output pairs.

As used herein, reinforcement learning may refer to machine learning (by the radio performance optimizer 113) of a function/policy that specifies the particular action(s) (i.e., (re-)configuration actions by the radio configurator 114) to take in a particular state s (i.e., the analysed state information of the radio scene provided by the radio scene analyser 111). The wanted function/policy maximizes a sum of immediate rewards for the particular action(s) taken (i.e., the reward metric provided by the radio performance analyser 112 in response to the (re-)configuration actions by the radio configurator 114).

In other words, reinforcement learning is about learning from experiences over time, and adopting a best possible behaviour.

Supervised deep learning and reinforcement learning may even be combined by pre-training the artificial neural network in simulation, test or evaluation environments and refining the decision-making by the artificial neural network based on reinforcement learning during ongoing operation.

The third mode 113C of operation provides an experiental level that may be configured to assess (re-)configuration decisions and save them in the artificial neuronal network. This may result in experience that too frequent re-configuration may be counter-productive for an average QoS assessment of the radio communication, especially in connection with adaptive/learning jammers. This experiental level may influence (re-)configuration decisions of the first and second modes (133A, 133B) of operation and facilitate or block re-configurations. As one example, the experiental level may indicate favourable initial values for global optimization.

Figure 5:
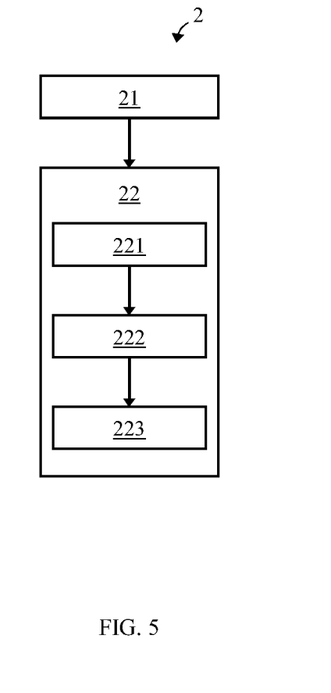
FIG. 5 schematically illustrates a flow chart of a method in accordance with the present disclosure of operating the CR communication device of FIG. 1.

FIG. 5 schematically illustrates a flow chart of a method 2 in accordance with the present disclosure of operating the CR communication device of FIG. 1.

The method 2 is suitable for operating a CR communication device 1.

The CR communication device 1 comprises a CR transceiver 11 and a digital twin 12 of the CR transceiver 11.

The method 2 comprises a step of analysing 21, by a radio scene analyser 111 of the CR transceiver 11, a state information of a radio scene involving the CR communication device 1.

The method 2 further comprises a step of controlling 22, by a cognitive engine 112, 113, 114 of the CR transceiver 11, a radio performance of the CR communication device 1.

The step of controlling 22 includes analysing 221, by a radio performance analyser 112 of the cognitive engine 112, 113, 114, a radio performance of the CR transceiver 11 or a radio performance of the digital twin 12.

The step of controlling 22 further includes optimizing 222, by a radio performance optimizer 113 of the cognitive engine 112, 113, 114, the radio performance of the CR transceiver 11 or the radio performance of the digital twin 12 in accordance with the radio performance analyser 112 and the radio scene analyser 111.

The step of controlling 22 further includes configuring 223, by a radio configurator 114 of the cognitive engine 112, 113, 114, the CR transceiver 11 or the digital twin 12 in accordance with the radio performance optimizer 113.

The invention claimed is:

1. A cognitive radio, CR, communication device, comprising:
   a CR transceiver; and
   a digital twin of the CR transceiver;
   the CR transceiver comprising:
      a radio scene analyzer for analyzing state information of a radio scene involving the CR communication device, and
      a cognitive engine for controlling a radio performance of the CR communication device; the cognitive engine including:
         a radio performance analyzer for analyzing a radio performance of the CR transceiver or a radio performance of the digital twin,
         a radio performance optimizer for optimizing the radio performance of the CR transceiver or the radio performance of the digital twin in accordance with the radio performance analyzer and the radio scene analyzer; and
         a radio configurator for configuring the CR transceiver or the digital twin in accordance with the radio performance optimizer.

2. The CR communication device of claim 1,
   the radio scene comprising one or more of:
   a spectrum allocation,
   a spectrum availability, and
   a spectrum use.

3. The CR communication device of claim 1,
   the CR transceiver further comprising a transceiver frontend; and
   the cognitive engine being configured, in a first mode of operation, to control the radio performance of the CR transceiver based on an optimization of a radio configuration of the transceiver frontend in accordance with analyzed radio performance metrics of the transceiver frontend.

4. The CR communication device of claim 3,
   the transceiver frontend comprising a software-defined radio, SDR, transceiver frontend.

5. The CR communication device of claim 3,
   the radio configuration of the transceiver frontend comprising one or more of:
   a waveform,
   a transmission power,
   a transmission frequency, and
   a reception frequency.

6. The CR communication device of claim 3,
   the radio performance metrics of the transceiver frontend comprising one or more of:
   a queue occupancy,
   a number of transmission retries,
   a throughput,
   a goodput,
   a latency,
   a received signal strength indication, RSSI, and
   a signal-to-noise ratio, SNR.

7. The CR communication device of claim 3,
   the radio performance optimizer being configured to optimize the radio configuration of the transceiver frontend based on real-time adaptive signal processing.

8. The CR communication device of claim 3,
   the digital twin further comprising a model of the transceiver frontend,
   radio performance metrics of the model of the transceiver frontend depending on the radio configuration of the model of the transceiver frontend and radio performance metrics and state information of the transceiver frontend; and
   the cognitive engine being configured, in a second mode of operation different from the first mode of operation, to control the radio performance of the CR transceiver based on an optimization of the radio configuration of the model of the transceiver frontend in accordance with analyzed radio performance metrics of the model of the transceiver frontend.

9. The CR communication device of claim 8,
   the radio performance optimizer being configured to optimize the radio configuration of the model of the transceiver frontend based on iterative global optimization; and
   the radio configurator being configured to apply a configuration of the model of the transceiver frontend to the transceiver frontend if the analyzed radio performance metrics of the model of the transceiver frontend outperform the analyzed radio performance metrics of the transceiver frontend by a preset threshold.

10. The CR communication device of claim 9,
    the global optimization comprising evolutionary computation.

11. The CR communication device of claim 9,
    an objective function of the global optimization comprising one or more of:
    a maximum connectivity,
    a minimal latency,
    a maximum goodput,
    a maximum interference robustness,
    a minimum observability,
    a maximum doppler immunity, and
    a maximum communication reach.

12. The CR communication device of claim 8, the cognitive engine being configured, in a third mode of operation different from the first and second modes of operation, to control the radio performance of the CR transceiver based on experience-based problem solving.

13. The CR communication device of claim 12, the experience-based problem solving comprising one or more of:
    deep learning of optimized radio configurations in dependence of respective analyzed state information of radio scenes and analyzed radio performance metrics; and
    reinforcement learning of optimized radio configurations in dependence of respective analyzed state information of radio scenes and analyzed radio performance metrics.

14. The CR communication device of claim 13,
    the deep learning comprising supervised learning.

15. A method of operating a cognitive radio, CR, communication device,
    the CR communication device comprising:
    a CR transceiver and
    a digital twin of the CR transceiver, the method comprising:

analyzing, by a radio scene analyzer of the CR transceiver, a state information of a radio scene involving the CR communication device; and controlling, by a cognitive engine of the CR transceiver, a radio performance of the CR communication device; the controlling including:

analyzing, by a radio performance analyzer of the cognitive engine, a radio performance of the CR transceiver or a radio performance of the digital twin, optimizing, by a radio performance optimizer of the cognitive engine, the radio performance of the CR transceiver or the radio performance of the digital twin in accordance with the radio performance analyzer and the radio scene analyzer; and configuring, by a radio configurator of the cognitive engine, the CR transceiver or the digital twin in accordance with the radio performance optimizer.

\* \* \* \* \*